UNITED STATES PATENT OFFICE.

EMILE POIZOT, OF GLOS, NEAR LISIEUX, FRANCE; ASSIGNOR TO LEON, ALEXANDRE, DOMINGO DE ROUSSEN, OF CONDOM, FRANCE.

MANUFACTURE OF INDIA-RUBBER FOR ELASTIC TIRES OF VEHICLE-WHEELS.

963,806.  Specification of Letters Patent. Patented July 12, 1910.

No Drawing.  Application filed July 6, 1909. Serial No. 506,019.

*To all whom it may concern:*

Be it known that I, EMILE POIZOT, a citizen of the Republic of France, and resident of Glos, near Lisieux, Calvados, France, have invented new and useful Improvements in and Relating to the Manufacture of India-Rubber for Elastic Tires of Vehicle-Wheels, which improvements are fully set forth in the following specification.

The present invention has for its object a process for the manufacture of spongy india-rubber for use for elastic tires for the wheels of vehicles, automobiles and cycles.

Given a rubber factory provided with the necessary appliances this process consists broadly in taking for example 10 kg. of gum (refined caoutchouc) mixing therewith 1 kg. of alkali or liquid ammonia and then adding 1 kg. of sulfur. The whole is mixed in a mixer so as to obtain a homogeneous paste and vulcanization is effected in a mold in a steam digester at 4 kg. pressure for 1 hour. The vulcanization might also be effected in the sulfur bath. This formula gives a nervy and somewhat costly product, but when a less nervy quality will suffice the cost price of the product may be considerably reduced by employing the following formula.

| | |
|---|---|
| Gum (refined caoutchouc) | 10.00 kilos |
| Sulfur | 1.00 " |
| Factice (oil solidified by boiling with sulfur) | 10.00 " |
| Alkali or liquid ammonia | 2.30 " |
| Total | 23.30 kilos |

(The "factice" or factice caoutchouc is obtainable commercially and all rubber manufacturers know how to prepare or procure it.)

The proportion of alkali indicated above need not be rigorously adhered to because there is necessarily some waste during the operation, and on the other hand this proportion varies slightly with the nature or the origin of the gum employed, and also in accordance with the degree of sponginess required. However, 10% of alkali of the weight of the mixture may be regarded as the minimum and 15% as the maximum. Between these two proportions there is a range of sponginess.

It is also possible without modifying the method of operating to obtain products of good quality by adding certain bodies to those previously mentioned. The following formula gives excellent results in practice.

| | | |
|---|---|---|
| Primary caoutchouc latex | 4.00 kilos | |
| Ordinary pure gum or caoutchouc | 4.00 " | 60 |
| Powdered old used rubber (first quality) | 4.00 " | |
| Sulfur | 0.80 " | |
| Oxid of zinc | 2.00 " | |
| White factice | 2.00 " | 65 |
| Volatile alkali (liquid ammonia) (about 5%). Add the alkali to the factice 625 cc. | | |
| | 16.80 kilos | |

Vulcanization is carried out in a closed vessel at a temperature at about 130° C., since this produces the best results. At this temperature the liquid ammonia which permeates the mass is converted into ammonia gas, and thus there is formed in the mass a large number of separate, closed cells or cavities, in each of which is confined ammonia gas under pressure. It is largely to this confined gas that the resiliency of the product is due.

What I claim is:—

1. The herein described process of forming spongy resilient rubber which consists in mixing thoroughly together pure gum or caoutchouc, liquid ammonia, and sulfur, and then vulcanizing at a low temperature the homogeneous paste thus obtained.

2. The herein described process of forming spongy resilient rubber suitable for vehicle tires and the like consisting in thoroughly mixing together pure gum or caoutchouc, aqua ammonia and sulfur so as to form a homogeneous paste, and then vulcanizing the same at a temperature not exceeding 135° C.

3. The herein described process of forming spongy resilient rubber suitable for vehicle tires and the like consisting in thoroughly mixing together pure gum or caoutchouc, aqua ammonia and sulfur so as to form a homogeneous paste, and then vulcanizing the same at a temperature not exceeding 135° C. in a closed vessel.

In testimony whereof I have signed this specification in the presence of two subscribing witnesses.

EMILE POIZOT.

Witnesses:
 EMILE LEDRET,
 H. C. COXE.